US005351468A

United States Patent [19]

Pominville

[11] Patent Number: 5,351,468

[45] Date of Patent: Oct. 4, 1994

[54] SELECTABLE WINDROWING MOWER ATTACHMENT AND METHOD OF MOUNTING

[76] Inventor: Joel Pominville, RD3 Box 2540, Middlebury, Vt. 05753

[21] Appl. No.: 40,840

[22] Filed: Mar. 31, 1993

[51] Int. Cl.[5] .............................................. A01D 57/30

[52] U.S. Cl. .................................. 56/192; 56/DIG. 2

[58] Field of Search ................. 56/181, 182, 192, 189, 56/DIG. 21, DIG. 2

[56] References Cited

U.S. PATENT DOCUMENTS 4,037,390 7/1977 Vogelenzang .................... 56/192 X
4,590,751 5/1986 Stephenson ........................... 56/192
4,757,672 7/1988 Roger .................................... 56/192

FOREIGN PATENT DOCUMENTS 467818 9/1950 Canada ................................. 56/192

*Primary Examiner*—David J. Bagnell
*Attorney, Agent, or Firm*—James H. Laughlin, Jr.

[57] ABSTRACT

A mower attachment for selectable side delivery of cut forage crops using a conveyor belt system incorporated in the attachment that is mounted behind the mower in a straddle fashion with at least one shock absorber interconnecting the attachment with the mower to limit vertical separation when traveling over rough ground. The attachment also including a hinged baffle to direct cuttings to the conveyor belt. With the baffle in an open position a portion of the cuttings fall on the conveyor belt and the remainder fall on the ground. Closing the baffle against the conveyor belt causes all cuttings to fall on the baffle.

4 Claims, 3 Drawing Sheets

12
26
12
28
14
12
30
12
12
30
10
12
20
12
22
24

SELECTABLE WINDROWING MOWER ATTACHMENT AND METHOD OF MOUNTING

TECHNICAL FIELD

The invention here relates to efficient, rugged, mechanically non-complex equipment attachable to mowers used for cutting forage crops. This invention provides selectable side delivery of cuttings for single or multiple windrowing. More specifically the invention provides an attachment with a curved deflector shield for catching and directing cuttings to a conveyor belt system that can move cuttings, and the assistance of a baffle system, for either right or left side windrowing.

BACKGROUND ART

Agricultural mowers are designed to cut forage crops including grass and grain in widths of from about eight feet up to twelve feet or more for each pass through a field. Cuttings are thrown from such mowers and lie behind the mowing equipment as it passes through a field. Depending on designed capabilities mowers can either throw cuttings to lie essentially directly behind the equipment in scattered patterns across the width cut by the mower, i.e., in a swath, or they can include deflectors made from, for example, sheet metal, also known as tin ware, for directing cuttings to lie in a continuous pile having a restricted width smaller than the width cut by the mower that extends directly behind the mowing equipment, i.e., in a windrow. Harvesting is made easier when cuttings are windrowed because harvester equipment can pick up windrowed cuttings without having to rake laterally from the sides or without having to make numerous passes over a field in order to harvest all cuttings spread over a field.

Today harvester capacities have so increased that harvesting single windrows of cuttings is a substantial underutilization of equipment capacity. In point of fact, currently available harvesters and bailers can adequately collect doubled windrows even when cuttings are windrowed from mowers cutting fourteen foot widths.

Windrow mergers are equipment of various types now being used to double windrows in order to take advantage of increased harvester capacities. For example, after mowing and windrowing, a windrow merger of one type is attached to a tractor. This equipment is used before, or as a part of the harvesting process, to rake up cuttings in a windrow on one side of the tractor and with a conveyor belt move and throw cuttings onto or beside a windrow on the other side of the tractor. If this windrow merger is used as part of the harvesting process, it must be attached to the front of the tractor and a harvester and baler or forage box must be attached to the back of the tractor. This front mounted windrow merger doubles windrows harvested by the back mounted harvester. Examples of such windrow mergers include the models 1150 and 1160 sold by the Gehl Company, West Bend, Wis.

Using a windrow merger in simultaneous combination with a harvester is an attempt at achieving time efficiency if windrows have not been previously doubled. However, combining pushing, pulling and powering disparate pieces of windrow merging and harvesting equipment causes undo increased wear and tear on tractors. In the alternative using a windrow merger of this type without a harvester at least doubles the time required to harvest cuttings. Additionally raking tends to mix rocks and other foreign objects in with cuttings in the doubled windrow. Raking also causes leaf loss in legume crops resulting in poorer quality hay or forage.

Attempts have also been made to provide windrow doubling attachments for use on mowers. A specific example of such a windrow doubling attachment is described in U.S. Pat. No. 4,590,751 issued to Stephenson. The described windrow doubling attachment is mounted from the mower frame at three points. As so mounted the windrow doubling attachment is supposed to be hung from the mower and entirely supported off the ground. To accomplish windrow doubling the described attachment includes in combination a complex mechanical system for shuttling a belt conveyor from side-to-side that is used to move cuttings. In one position for the shuttled belt conveyer, cuttings are thrown from the mower onto the belt conveyor that then laterally moves the cuttings away from the mower to one side. In another shuttled position for the belt conveyor, a portion of the cuttings are thrown from the mower onto the ground and the remainder of the thrown cuttings fall onto the belt conveyor that then moves and drops them on the ground with those originally thrown from the mower. As mounted on mowers the described windrow doubler receives cuttings that have been initially deflected by mower tin ware for windrowing irrespective of whether or not the described windrow doubler is used with the mower. The combination of mower windrowing tin ware and the described windrow doubler equipment unavoidably constrains flow of cuttings to the point that when the mower cuts through thick crops the increased density of cuttings clogs in the region of the mower tin ware and the described windrow doubler. The clogged cuttings must then be manually removed which is both an inefficient and dangerous operation. Such windrow doubling equipment because of its exclusive attachment to the back of mower frames also unavoidably causes undue wear and tear to mower frames. Additionally mowers can become unbalanced because this windrow doubling equipment is both mounted and suspended only from the aft portion of mowers without having counterbalancing weight positioned on the forward portion of mowers. Further the windrow doubling equipment described here includes substantial mechanical complexity in devices and structures required to shuttle the belt conveyor system from side-to-side.

DISCLOSURE OF THE INVENTION

The present invention is a selectable windrow merger attachment that is mountable with and on mower equipment so the windrow merger attachment straddles mower frames. This windrow merger invention can be used with all types of mowers to provide doubled windrows. Therefore, significantly improved time efficient harvesting is achieved with the windrow doubling capability of the invention in combination with its concurrent use on mowers.

Mower cuttings are caught by the windrow merger invention before they reach the ground and are selectably moved to either the right or left on a conveyor belt and thrown to the ground. Of significant importance to use of the invention is that all mower tin ware used to deflect cuttings for windrowing is removed prior to attachment of windrow merger invention efficiently collects and moves cuttings for selectable windrowing on either left or rights of mower equipment. Further, the windrow merger invention as mounted on mowers without windrowing tin ware does not clog cuttings even when unusually thick crops are cut. This capability overcomes deficiencies of prior windrow doubler equipment. Additional raking to double windrows and the unavoidable intermixing of rocks and foreign matter with cuttings is completely avoided with the present invention, As mounted with and on mowers the windrow merger invention uses both the mower hitch and frame for attachment and support in a straddle fashion. This multiple attachment and suspension arrangement substantially minimizes wear and tear on mower structures in addition to effectively balancing the windrow merger invention on mowers. Further mitigating stress and strain forces on mower structures produced by the windrow merger invention is use of a shock absorber that couples the mower frame to the windrow merger equipment. Thus mounted the shock absorber substantially minimizes upward movement of the windrow merger and therefore separation between it and the mower when being pulled over rough terrain. Additionally the shock absorber cushions falling windrow merger equipment from crashing onto mower frames and other parts. A cushioning pad is placed between the mower frame and windrow merger invention to soften impacts on mowers from falling windrow merger equipment. Lateral movement of windrow merger equipment on mowers is prevented with use of a solid stabilizer bar attached to the mower and windrow merger equipment.

The windrow merger invention includes a deflector shield for catching and directing cuttings to a conveyor belt system that can move the cuttings for either right or left side windrowing- A hinged baffle is also attached to the windrow merger frame. This baffle can be moved about its hinged mounting using an hydraulic actuator controlled from the tractor cab. Cuttings, depending on the position of the baffle, can be exclusively delivered to the conveyor belt or a portion of them can be dropped on the ground and the remainder dropped on the conveyor belt.

BRIEF DESCRIPTION OF THE DRAWINGS

The various objects, advantages and novel features of the present invention will become more readily apprehended from the following detailed description when taken in conjunction with the appended drawings, in which.

BEST MODE FOR CARRYING OUT THE INVENTION

Figure 1:
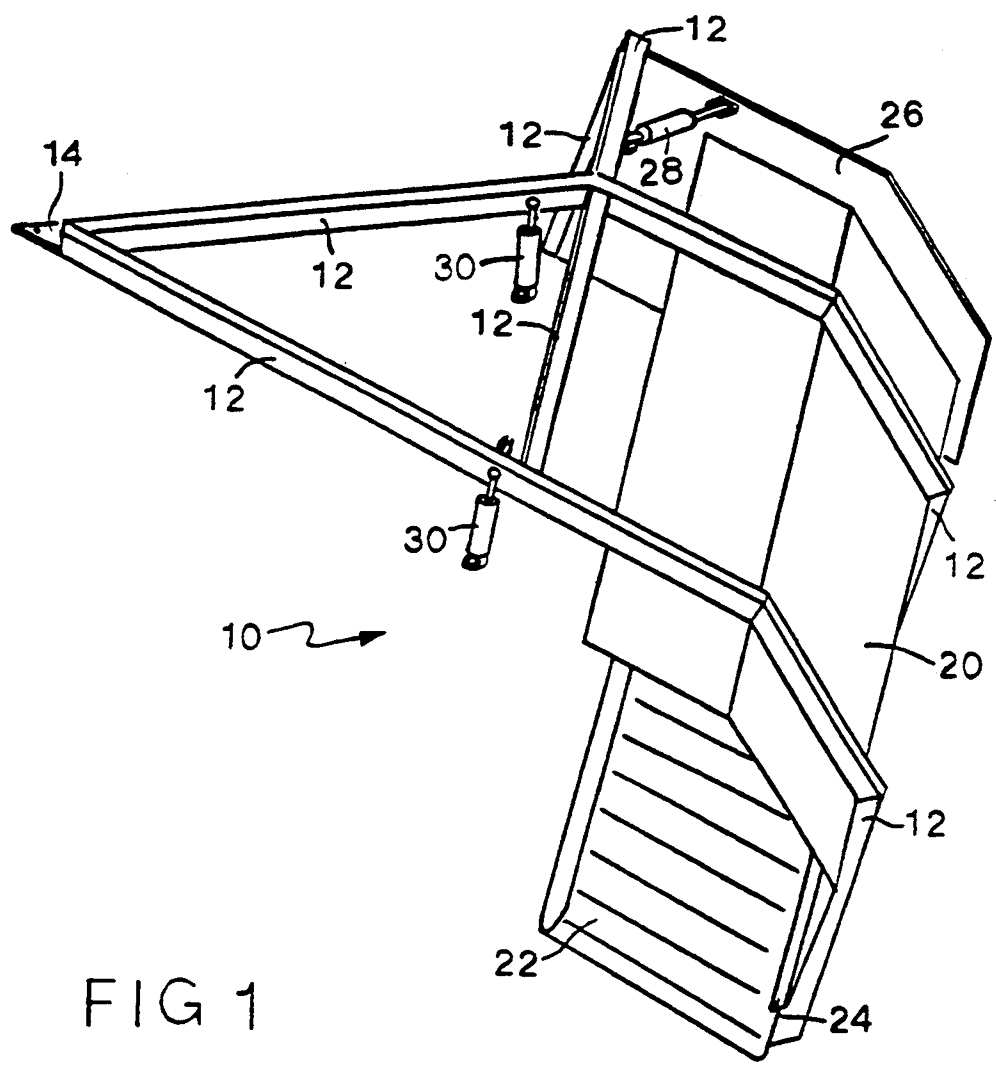
FIG. 1 is a perspective view of the windrow merger of the present invention.

Referring now to the drawings, where corresponding components are designated by the same reference numerals throughout the various figures, a perspective view of an windrow merger according to the present invention is shown in FIG. 1 where it is generally designated by reference numeral 10. This windrow merger 10 includes a frame 12 that can be made by welding standard 2×4 box beams. An attachment plate 14 is welded to the front of the frame 12. Attachment plate 14 is used to attach the windrow merger 10 to the mower hitch 18 (see FIG. 2) using standard bolt or pin structures. Prior to this attachment of the windrow merger 10 to the mower 16 tin ware used for windrowing (not shown) is removed. Such tin ware is removably mounted on mowers and is readily taken as is known by farmers and others who use such mowers. Removing this tin ware lightens the mower 16 equipment which assists in compensating for windrow merger 10 weight. Also the windrow merger 10 by its design has sufficient capability for catching cuttings without the tin ware and the windrow merger 10 so mounted on mower 16 is not susceptible to clogging cuttings. A deflector shield 20 is attached by spot welds, screws, rivets or other known fasteners at the back end of the frame 12. The function of the deflector shield 20 is to catch and direct mower cuttings down onto a conveyor belt 22. To further assure directing of cuttings to the conveyor belt, the deflector shield 20 can include a lip 24 that is bent over the conveyor belt to prevent cuttings from falling onto the ground between the conveyor belt 22 and the deflector shield 20.

In addition to the deflector shield 20 for catching and directing cuttings to a conveyor belt 22 there is also a moveable baffle 26 for catching and directing cuttings to the conveyor belt 22. The moveable baffle 26 is hinge mounted from the frame 12 and can be moved through various positions using an hydraulic actuator 28, electric motor, or other system that can be controlled from the tractor cab. In spite of mower windrow tin ware being removed this movable baffle 26 in combination with deflector shield 20 efficiently collects cuttings for windrow doubling. Description of how baffle 26 is used to assist in making windrows is set out below.

Figure 2:
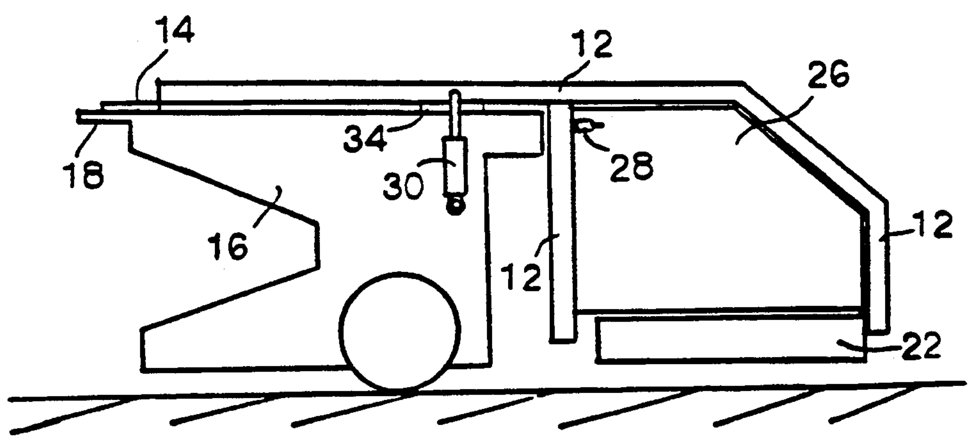
FIG. 2 is a side plan view showing the windrow merger of the present invention shown in FIG. 1 mounted on a mower.
Figure 3:
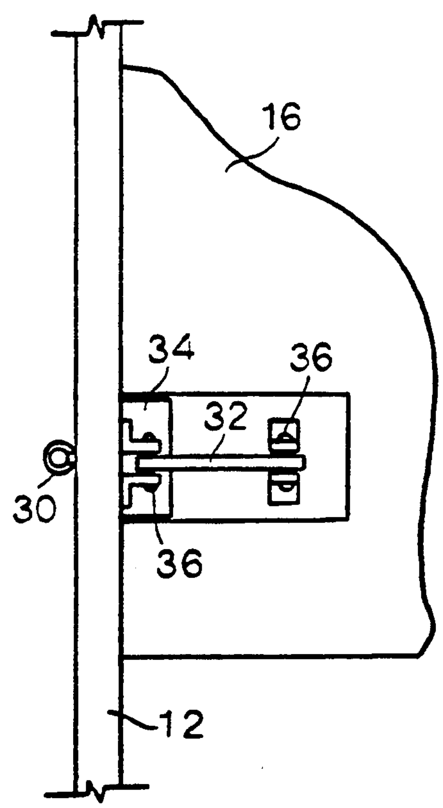
FIG. 3 is a partial view of the frame for the windrow merger of the present invention, shown in FIG. 1, and a mower showing a solid stabilizer bar interconnecting the frame for the windrow merger of the present invention and the mower frame.

The windrow merger 10 is attached and mounted on and over a mower 16 as shown in FIG. 2. While the windrow merger attachment plate 14 is used to connect the windrow merger 10 to the mower hitch 18 so that the windrow merger 10 can be pulled with the mower 16, a shock absorber 30 and stabilizer bar 32 (see FIG. 3) in combination with an absorber pad 34 are used to connect the windrow merger 10 to the mower 16 frame so as to minimize vertical and lateral movements of the windrow merger 10 from those of the mower 16. In particular, the shock absorber 30 is bolted to both the windrow merger frame 12 and the mower 16, and is used to reduce and cushion vertical movement of the windrow merger 10 with respect to the mower 16. To best accomplish this result the shock absorber 30 should be bolted to either the mower 16 frame or as close to the frame (not shown) as possible. This attachment to the mower 16 should also be as close to the center of gravity for the mower as is possible. Multiple shock absorbers 30 can be used depending on mower 16 structures. For many applications two shock absorbers 30 are sufficient. (see FIG. 1) Cushioning impacts of the windrow merger 10 against the mower 16 are cushion pads 34 (see FIGS. 2 and 3). These cushion pads 34 can be made of rubber or other tough resilient material. They should be mounted between the windrow merger 10 and the mower frame or as near the mower frame as possible so that the weight of the windrow merger 10 is supported on top of these cushion pads 34. As for preventing lateral movement of the windrow merger 10 with respect to the mower 16 a stabilizer bar 32 is used. Again, the stabilizer bar 32 is connected to the windrow merger frame 12 and the mower frame or as close to the mower frame as possible. Bolts 36, as shown in FIG. 3, are used to connect the stabilizer bar 32 to the windrow merger frame 12 and the mower 16. These bolts 36 are not tightly connected to the stabilizer bar 32 but instead the bolts 36 allow the stabilizer bar 32 to rotate so that when the windrow merger 10 moves vertically upward with respect to the mower 16 the windrow merger 10 does not drag the mower 16 upward because of the stabilizer bar 32 interconnection. As shown in FIG. 3, though, the stabilizer bar 32 does prevent lateral movement of the windrow merger with respect to the mower 16.

Figure 4:
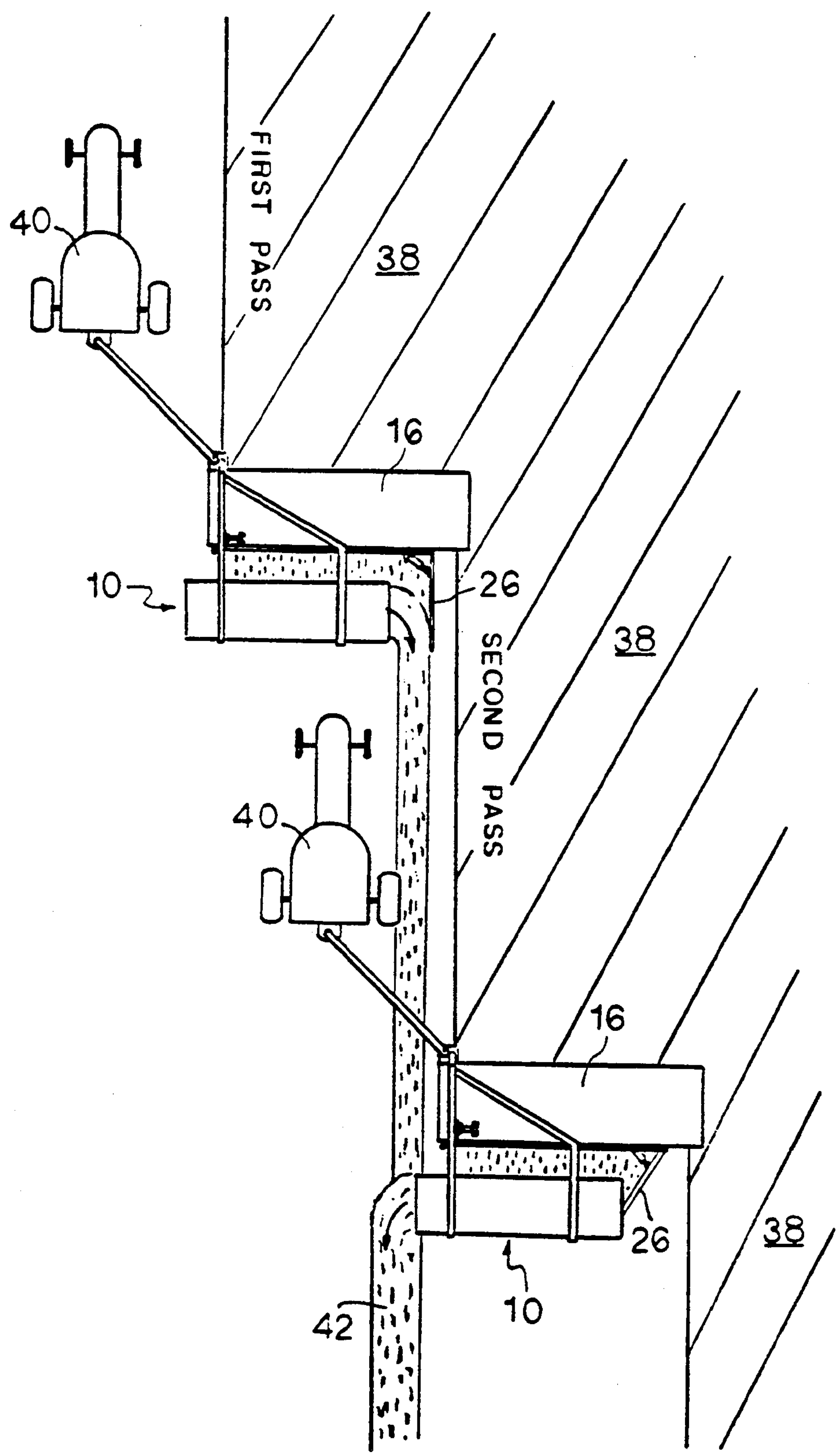
FIG. 4 is a schematic view illustrating one method for operating a mower with a windrow merger of the present invention shown in FIG. 1 to make a double windrow in accordance with a preferred embodiment of this invention.

Use of the windrow merger 10 is shown in FIG. 4. There an uncut crop 38 is shown. Both a "first pass" and a "second pass"0 of a tractor 40 pulling a mower 16 with an attached windrow merger 10 are also shown. For the "first pass" the baffle 26 is in an open position so that cuttings from the mower 16 are both collected by the windrow merger 10 and dropped on the ground. In particular conveyor belt 22 is rotated so that cuttings fall to the ground with those that pass adjacent the baffle 26. The direction and amount of conveyor belt 22 rotation can be controlled from the tractor 40 cab to drop cuttings either on the right or left side of the windrow merger 10. Standard motors and controls are used to provide rotation of conveyor belt 22. For the "second pass" the baffle 26 is moved to a closed position so cuttings are all directed to the conveyor belt 22. Here cuttings are moved and dropped from the opposite side of the windrow merger 10 from those for the "first pass". So windrow 42 is a doubled windrow. Depending on the speed that the conveyor belt 22 is rotated, the cuttings can either be thrown or dropped to form doubled windrows that are wide and thin to, for example, quicken drying of cut crops, or the doubled windrows can be made narrow and thick, The above discussion and related illustrations of the present invention are directed primarily to preferred embodiments and practices. However, it is believed numerous changes and modifications in actual implementation of described concepts will be apparent to those skilled in the art, and it is contemplated that such changes and modifications may be made without departing from the scope of the invention as defined by the following claims.

What is claimed is:

1. A windrow merger for mowers comprising:

a frame means;

a conveyor belt means fixedly mounted on said frame means;

a baffle means attached to said frame means from a hinge means with an actuator means attached to said baffle means to move said baffle means about said hinge means so mower cuttings are caught and fall from said baffle means onto said conveyor belt means; and, a shock absorber means attached to said frame means and said mower.

2. The windrow merger of claim 1, further including a stabilizer bar means attached to said frame means and said mower.

3. A method for mounting a windrow merger on a mower including the steps of:

removing mower tin ware used for directing cuttings for windrowing;

positioning a windrow merger frame means on top of mower frame structures;

attaching said windrow merger frame means to mower hitch means; and, attaching a shock absorber means to said mower and said windrow merger.

4. The method of claim 3, further including the step of attaching a stabilizer bar means to said mower and said windrow merger.

* * * * *